(12) United States Patent
Parrett et al.

(10) Patent No.: US 8,186,468 B2
(45) Date of Patent: May 29, 2012

(54) VEHICLE LOAD FLOOR SUPPORT WITH INTEGRAL AIR DUCT

(75) Inventors: Alan V. Parrett, Milford, MI (US); Kyle W. Stanforth, Brighton, MI (US); Hua He, North Potomac, MD (US); Timothy J. Roggenkamp, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 579 days.

(21) Appl. No.: 12/033,445

(22) Filed: Feb. 19, 2008

(65) Prior Publication Data

US 2009/0205891 A1 Aug. 20, 2009

(51) Int. Cl.
*B60K 11/06* (2006.01)

(52) U.S. Cl. ....... 180/68.1; 180/65.1; 903/903; 903/952

(58) Field of Classification Search ................. 180/68.5, 180/65.1, 68.1, 313, 312; 280/727, 782, 280/783; 220/902
See application file for complete search history.

(56) References Cited

U.S. PATENT DOCUMENTS

| | | | |
|---|---|---|---|
| 5,390,754 A * | 2/1995 | Masuyama et al. ......... | 180/68.5 |
| 5,392,873 A * | 2/1995 | Masuyama et al. ......... | 180/68.5 |
| 5,788,320 A | 8/1998 | Hanemaayer | |
| 6,094,927 A * | 8/2000 | Anazawa et al. ............ | 62/239 |
| 6,188,574 B1 * | 2/2001 | Anazawa ..................... | 361/695 |
| 6,662,891 B2 * | 12/2003 | Misu et al. .................. | 180/68.1 |
| 6,798,658 B2 * | 9/2004 | Takedomi et al. ........... | 361/694 |
| 6,945,594 B1 | 9/2005 | Bejin et al. | |
| 7,017,980 B1 | 3/2006 | Bejin et al. | |
| 7,051,825 B2 * | 5/2006 | Masui et al. ................. | 180/68.5 |
| 7,240,752 B2 * | 7/2007 | Takahashi et al. .......... | 180/68.1 |
| 7,401,669 B2 * | 7/2008 | Fujii et al. .................... | 180/65.1 |
| 7,610,978 B2 * | 11/2009 | Takasaki et al. ............ | 180/68.5 |
| 7,688,582 B2 * | 3/2010 | Fukazu et al. ............... | 361/690 |
| 7,967,093 B2 * | 6/2011 | Nagasaka .................... | 180/68.5 |
| 2001/0030069 A1 | 10/2001 | Misu et al. | |
| 2005/0285563 A1 | 12/2005 | Yoneda | |
| 2008/0196957 A1 * | 8/2008 | Koike et al. ................. | 180/68.5 |
| 2009/0145676 A1 * | 6/2009 | Takasaki et al. ............ | 180/65.1 |

FOREIGN PATENT DOCUMENTS

| | | |
|---|---|---|
| DE | 102005028950 A1 | 1/2006 |
| DE | 60128619 T2 | 1/2008 |
| JP | 10000946 A * | 1/1998 |
| JP | 2006182044 A * | 7/2006 |

* cited by examiner

*Primary Examiner* — J. Allen Shriver, II
*Assistant Examiner* — Bridget Avery
(74) *Attorney, Agent, or Firm* — Quinn Law Group, PLLC

(57) ABSTRACT

A porous, sound absorbing structural foam load floor support is provided that defines an integral duct. The duct is configured as a ventilation air passage from the air outlet of a heat-emitting component, such as an energy storage system in a hybrid vehicle, so that the load floor support serves both to support the load floor as well as to provide a route for heat dissipation. By integrating the duct within the load floor support, a separate duct, which would have to route around other vehicle components located under the load floor, is not required. The structural foam load floor support is configured to absorb noise of a cooling system for the energy storage system. A porous expanded polypropylene foam is especially well-suited for noise attenuation and load floor support.

17 Claims, 3 Drawing Sheets

VEHICLE LOAD FLOOR SUPPORT WITH INTEGRAL AIR DUCT

TECHNICAL FIELD

The invention relates to a load floor support with an integral air duct, and specifically to a porous, sound absorbing structural foam load floor support with an integral air duct for cooling air for an energy storage system on a vehicle.

BACKGROUND OF THE INVENTION

Hybrid vehicles that utilize stored electrical energy in combination with another power source, such as an internal combustion engine or a fuel cell, may offer fuel efficiency and other advantages. Many hybrid vehicles proposed to date (such as but not limited to sport utility vehicles (SUVs), minivans, station wagons, and hatchbacks) have an energy storage system packaged within the vehicle passenger compartment. As the energy storage system emits a significant amount of heat, the heat must be vented outside of the passenger compartment. A fan may be used to assist with directing the heat out of the vehicle. Some fans generate a level of noise that requires attenuation for passenger comfort.

SUMMARY OF THE INVENTION

A porous structural foam load floor support is provided that defines an integral duct. The duct is configured to be in fluid communication with a heat-emitting component, such as an energy storage system in a vehicle, so that the load floor support serves both to support the load floor as well as to provide a route for heat dissipation. By integrating the duct within the load floor support, a separate duct, which would have to route around other vehicle components located under the load floor, is not required. The porous structural foam load floor support is configured to absorb noise produced by a cooling fan of a cooling system included in the energy storage system. A porous expanded polypropylene foam is especially well-suited for noise attenuation.

The duct may be configured with a main passage that routes from the cooling system to a vent which allows air out of the passenger compartment, so that the cooling system air (e.g., air exhausted from the energy storage system by a fan) is then directed outside of the vehicle. One or more side passages in the duct may be formed in the structural foam load floor support. The side passages can be configured to function as acoustic resonators to optimize noise attenuation. Because other vehicle components may be packaged under the load floor, the structural foam load floor support may be configured with packaging cavities to securely position and retain such components. The shape and routing of the integral duct may be based in part on a necessity to route around these or other vehicle components. Because the duct is integral with the foam load floor support, any "squeak and rattle" noise associated with an interface between a foam load floor support and a separate (non-integrated) duct is avoided. Integrating the side passages with the main passage in the structural foam load floor support eliminates the complexity of connecting separate tuning structure with a separate (non-integrated) duct, while at the same time trying to avoid other components under the load floor.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
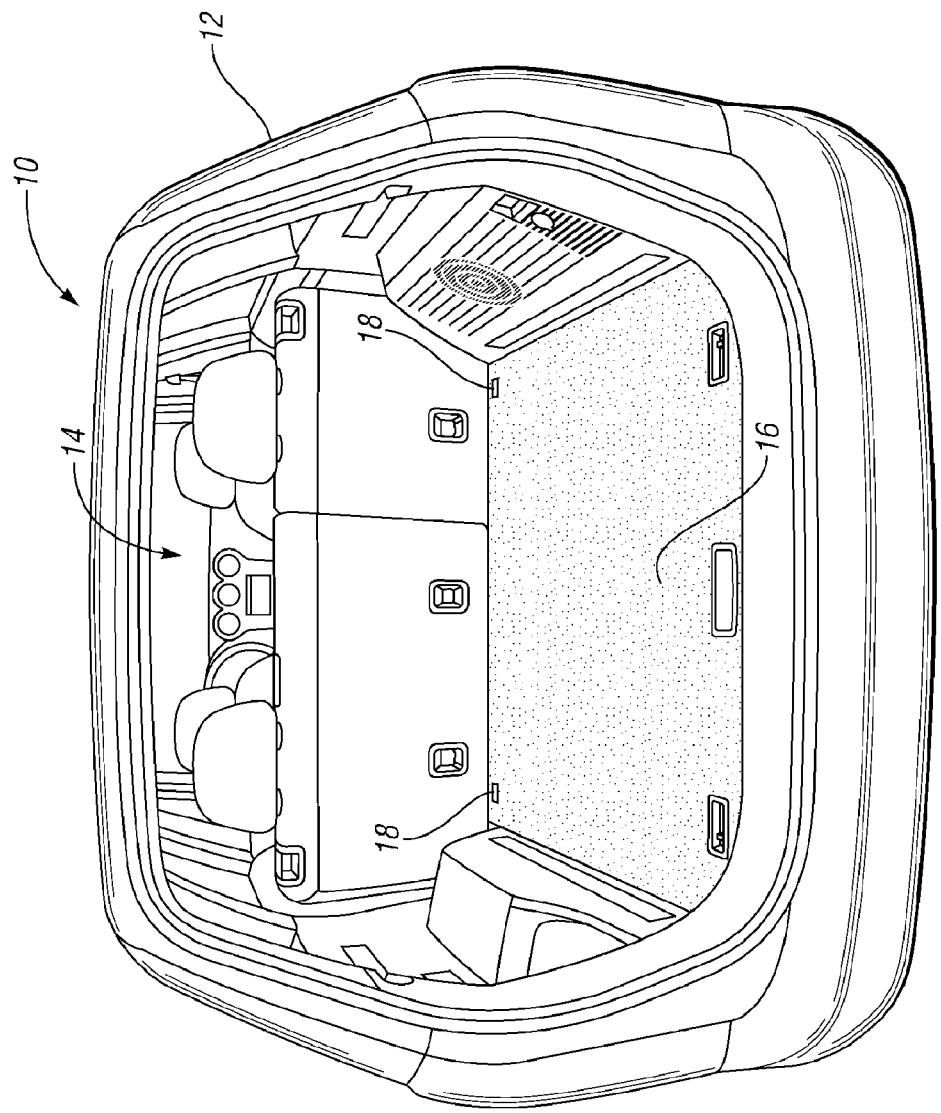
FIG. 1 is a schematic perspective illustration of a hybrid SUV type vehicle with a rear gate removed to expose a rearward portion of an interior passenger compartment with a load floor.

Referring to the drawings, wherein like reference numbers refer to like components, FIG. 1 shows a hybrid vehicle 10 (such as but not limited to sport utility vehicles (SUVs), minivans, station wagons, and hatchbacks). The hybrid vehicle 10 may be any type of hybrid, i.e., any vehicle with at least two primary sources of power, such as a gasoline electric, diesel electric, or a fuel cell hybrid vehicle. The vehicle 10 has vehicle body structure 12, such as body panels, that define an interior passenger compartment 14 and separate the interior passenger compartment 14 from outside of the vehicle (i.e., from the surrounding environment). A load floor 16 is within the passenger compartment 14 and is movable via hinges 18 from the closed position of FIG. 1 to an open position of FIGS. 2 and 3.

Figure 2:
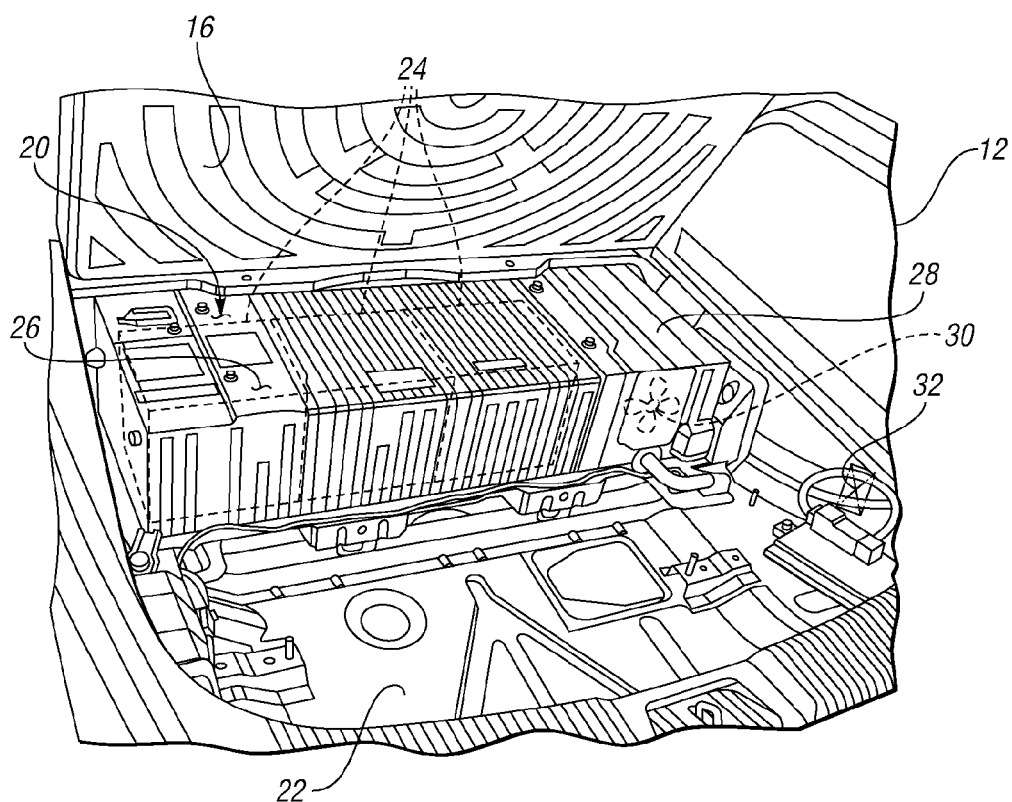
FIG. 2 is a schematic perspective illustration of the hybrid vehicle of FIG. 1, with the load floor lifted to expose a portion of a hybrid powertrain including an energy storage system that includes batteries and a battery cooling system with a fan and showing the location of a passenger compartment pressure relief vent.

Referring to FIG. 2, with the load floor 16 open, an energy storage system 20 is visible packaged within the passenger compartment 14, above a floor pan 22 but below the load floor 16. The energy storage system 20 includes one or more batteries 24, indicated in phantom below an outer battery casing 26. The batteries may be of any type, such as lithium ion batteries. The batteries 24 emit heat and require cooling via a battery cooling system 28, also included in the energy storage system 20, situated adjacent to the batteries 24. The battery cooling system 28 includes a fan 30, represented by fan blades in FIG. 2, used to exhaust heat away from the batteries 24. Also shown in FIG. 2 is a vehicle pressure relief vent 32 mounted in the vehicle body structure 12 and operable to allow heating, ventilation, and air conditioning flow in the passenger compartment 14 (shown in FIG. 1) by venting air outside of the vehicle 10. The pressure relief vent 32 is shown only schematically, and may have a different shape, size or configuration than that shown. Although a hybrid vehicle is illustrated, the load floor support 34 discussed below may be utilized on any vehicle having an energy storage system packaged within a passenger compartment, such as under a load floor, including but not limited to a fuel cell vehicle and an electric vehicle.

Figure 3:
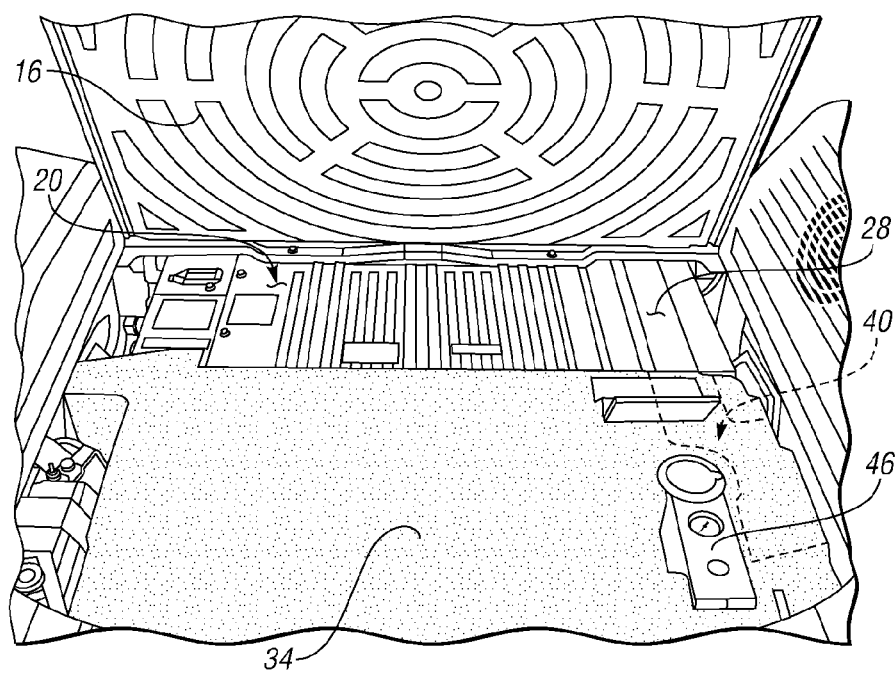
FIG. 3 is a schematic perspective illustration of the hybrid vehicle of FIGS. 1 and 2, with a load floor structural support installed adjacent to the energy storage system and forming an integral duct for venting the energy storage system to the pressure relief vent of FIG. 2.
Figure 4:
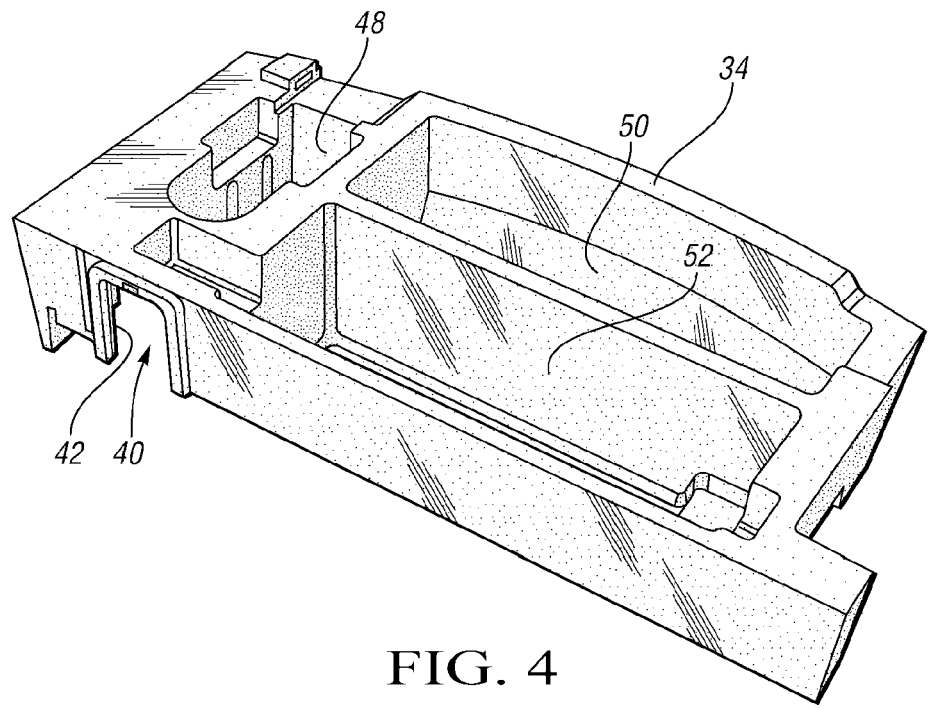
FIG. 4 is a schematic perspective illustration of the load floor structural support of FIG. 3 from above.

Referring to FIG. 3, a unitary load floor support 34 is installed above the floor pan 22 of FIG. 2 and adjacent the energy storage system 20 with integral cooling system 28. The load floor support 34 is made of a porous, sound absorbing structural foam material, such as porous expanded polypropylene foam. The porous structural foam material is lightweight to potentially increase fuel economy while being of sufficient strength to support the load floor 16. Furthermore, structural foam that is porous has air pockets that help attenuate noise both in the duct and in the passenger compartment 14, which is advantageous as the fan 30 is a noise-generating component. Finally, structural foam material may be molded into complex shapes. In this embodiment, the structural foam load floor support 34 forms an integrated duct 40, shown in phantom in FIG. 3 and best shown in the view of the load floor support 34 from below in FIG. 5. The duct 40 may also be referred to as a channel. The duct 40 is substantially three-sided, as shown in FIG. 4. The open bottom of the duct 40 in FIG. 4 is closed off by the floor pan 22 of FIG. 2 when the structural foam load floor support 34 is installed in the vehicle as shown in FIG. 3. Although the duct 40 is shown with three sides, in other embodiments, the duct may have a more cylindrical cross-sectional shape, and may be completely embedded within the structural foam material, without an open side.

Figure 5:
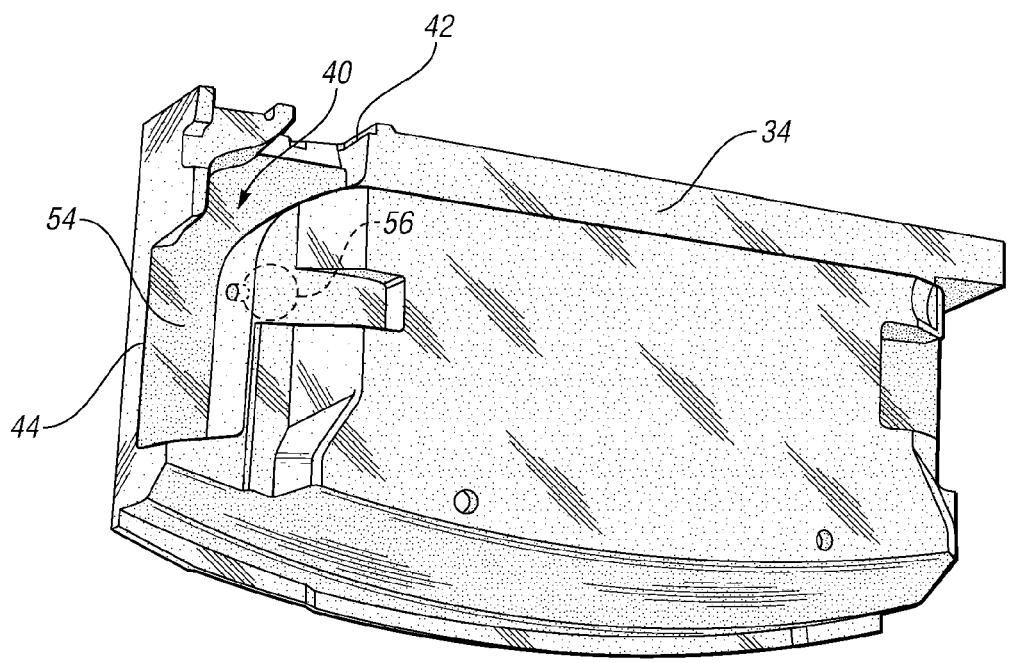
FIG. 5 is a schematic perspective illustration of the load floor structural support of FIGS. 3 and 4 from below.

In FIGS. 4 and 5, an opening 42 of the duct 40 is apparent that is in fluid communication with and adjacent the fan 30 of FIG. 2 when installed as shown in FIG. 3. The duct 40 has an exit 44 (shown in FIG. 5) that is positioned to be in communication with the vent 32 of FIG. 2 when installed as shown in FIG. 3. Accordingly, the duct 40 allows heat to be vented from the fan 30 to the outside of the vehicle 10 via the vent 32.

The duct 40 is configured in a tortuous path, e.g., a nonlinear path with "elbow" turns, between the opening 42 and the exit 44. The structural foam load floor support 34 is molded in a variety of complex shapes to form packaging cavities to support and retain the position of various vehicle components, such as a compressor kit 46 shown in FIG. 3. The packaging cavity 48 for the compressor kit 46 is visible in FIG. 4. Additional packaging cavities 50, 52 may be used for cargo net, tool, jack, or other item storage. The moldability of the structural foam load floor support 34 allows the duct 40 to be configured to route around such other vehicle components. Additionally, the duct 40 is configured with a shape that attenuates noise and promotes air flow. For example, the moldability of the structural foam allows a main passage 54 of the duct 40 to communicate with a side passage 56 or acoustic resonator feature which is sized and positioned to function as a molded-in acoustic resonator and/or tuner. The side passage 56 of this embodiment has a short tubular portion emptying into a spherical cavity (e.g., a Helmholtz resonator). Alternatively, a slightly larger and longer tubular passage (e.g., a ¼ wave tuner) could be used in lieu of the short tubular portion and spherical cavity. The shape and position of the side passage 56 is meant to be exemplary only. The number, size and location of such resonating and tuning side passages 56 would be based on mathematical acoustic models, taking into account the size of the main passage 54, fan noise tones, permeability of the structural foam, etc.

Thus, by providing a structural foam load floor support 34, a separate duct component is not required, and heat dissipation of the battery module 20, and noise and temperature of the interior compartment 14 is managed at least in part by the porous, sound absorbing structural foam load floor support 34.

While the best modes for carrying out the invention have been described in detail, those familiar with the art to which this invention relates will recognize various alternative designs and embodiments for practicing the invention within the scope of the appended claims.

The invention claimed is:

1. A vehicle defining a passenger compartment and having an energy storage system for powering the vehicle; wherein the energy storage system has at least one battery and a cooling system; wherein the energy storage system is located within the passenger compartment beneath a load floor and above a floor pan, comprising:
   a load floor support beneath the load floor and above the floor pan and adjacent to and separate from the energy storage system; wherein the load floor support and the floor pan together form an integral duct extending from the cooling system to vent the energy storage system; wherein the integral duct is positioned relative to the cooling system so that air enters the integral duct after exiting the cooling system; wherein the integral duct is defined from above by the load floor support and from below by the floor pan; and wherein the load floor support is configured to reduce cooling system noise.

2. The vehicle of claim 1, wherein the load floor support is a structural porous molded foam that is sound absorbing to reduce battery cooling system noise.

3. The vehicle of claim 1, wherein the load floor support is porous expanded polypropylene foam.

4. The vehicle of claim 1, wherein the vehicle includes vehicle body structure; wherein the load floor support is included in the vehicle body structure, and further comprising:
   a vent in the vehicle body structure operable to allow air flow from the passenger compartment to outside of the vehicle; wherein the duct extends from the battery cooling system to the vent to direct cooling air outside of the vehicle.

5. The vehicle of claim 1, wherein the duct has a main passage and at least one side passage in fluid communication with the main passage and defined entirely by the load floor support to act as an acoustic resonator; and wherein the side passage is configured to reduce cooling system noise.

6. The vehicle of claim 1, wherein the cooling system includes a fan operatively connected to the duct.

7. The vehicle of claim 1, wherein the duct is characterized by a shape to optimize fluid flow and noise attenuation.

8. The vehicle of claim 1, wherein the load floor support forms at least one packaging cavity for a vehicle component.

9. The vehicle of claim 1, wherein the load floor support forming the integral duct is a one-piece component.

10. The vehicle of claim 9, wherein the at least one side passage has a substantially tubular portion.

11. The vehicle of claim 10, wherein the at least one side passage has a substantially spherical cavity at an end of the substantially tubular portion.

12. An apparatus for a vehicle with a heat-emitting component under a load floor comprising:
   a structural foam load floor support separate from the heat-emitting component defining an integral cooling duct in fluid communication with the heat-emitting component for venting heat therefrom;
   wherein the duct has a main passage defining an air flow inlet and an air flow outlet, and at least one side passage in fluid communication with the main passage and arranged substantially laterally to the main passage between the air flow inlet and the air flow outlet; wherein both the main passage and the at least one side passage are defined by the structural foam load floor support;
   wherein the at least one side passage has a substantially tubular portion; and wherein the at least one side passage has a substantially spherical cavity at an end of the substantially tubular portion.

13. The apparatus of claim 12, wherein the vehicle includes a noise-generating cooling system for the heat-emitting component located adjacent the heat-emitting component under the load floor; and wherein the duct is configured such that the structural foam load floor support absorbs noise of the cooling system.

14. The apparatus of claim 12, wherein the structural foam load floor support is porous expanded polypropylene foam.

15. A vehicle comprising:
    vehicle body structure including a floor pan, a load floor and at least partially defining a passenger compartment above the load floor;
    a powertrain including an energy storage system supported below the load floor by the floor pan;
    wherein the energy storage system includes an integral cooling fan below the load floor; and
    a structural foam load floor support below the load floor adjacent to and separate from the energy storage system, supported by the floor pan and not supporting the energy storage system and forming an integral duct in fluid communication with the cooling fan to vent cooling air used to cool the energy storage system, the air exiting the energy storage system at the cooling fan prior to flowing through the integral duct, and wherein the structural foam load floor support is configured to absorb fan noise.

16. The vehicle of claim 15, wherein the structural foam load floor support is porous expanded polypropylene foam.

17. The vehicle of claim 15, wherein the structural foam load floor support further forms packaging cavities for at least partially securing vehicle components within the vehicle.

* * * * *